Dec. 29, 1942.  W. D. TIPTON  2,306,834
POWER TRANSMISSION
Filed Sept. 30, 1940  2 Sheets-Sheet 1

INVENTOR
William D. Tipton.
BY Hamess, Dind, Patt & Harris
ATTORNEYS.

Dec. 29, 1942.  W. D. TIPTON  2,306,834
POWER TRANSMISSION
Filed Sept. 30, 1940   2 Sheets-Sheet 2

INVENTOR
William D. Tipton.
BY Hamess Lind, Pate & Harris
ATTORNEYS.

Patented Dec. 29, 1942

2,306,834

UNITED STATES PATENT OFFICE 2,306,834

POWER TRANSMISSION

William D. Tipton, Baltimore, Md.

Application September 30, 1940, Serial No. 359,012

23 Claims. (Cl. 74—189.5)

This invention relates to hydrodynamic transmissions, and particularly to transmissions of this type embodying a fluid torque converter and a gearset in combination.

The principal object of the invention is to provide an improved automatically variable ratio power transmission particularly adapted for use in motor vehicles.

Another object is to provide an improved power transmission of the fluid type wherein the hydraulic power transmitting structure will function as a torque converter during vehicle operation under conditions of high torque demand and low speed, and as a fluid coupling of the kinetic type under conditions of relatively low torque demand and high speed.

A further object is to provide an improved hydrodynamic transmission which will operate to automatically furnish two ratios of torque conversion corresponding to first and second speed ratios in the conventional motor vehicle power transmission, a stage of coupling drive corresponding to direct drive in the conventional transmission, and a stage of overdrive.

A still further object is to provide in a transmission of the aforesaid type means for obtaining zero torque transmission under conditions when the vehicle is at rest with the engine running thereby providing a no-drag neutral.

Further objects and advantages will readily become apparent from the following description.

Reference is made to the accompanying drawings in which reference characters have been used to designate corresponding parts referred to in the following description, and wherein Fig. 1 is a longitudinal central sectional view of the upper half of a preferred embodiment of the power transmission.

Figure 1:
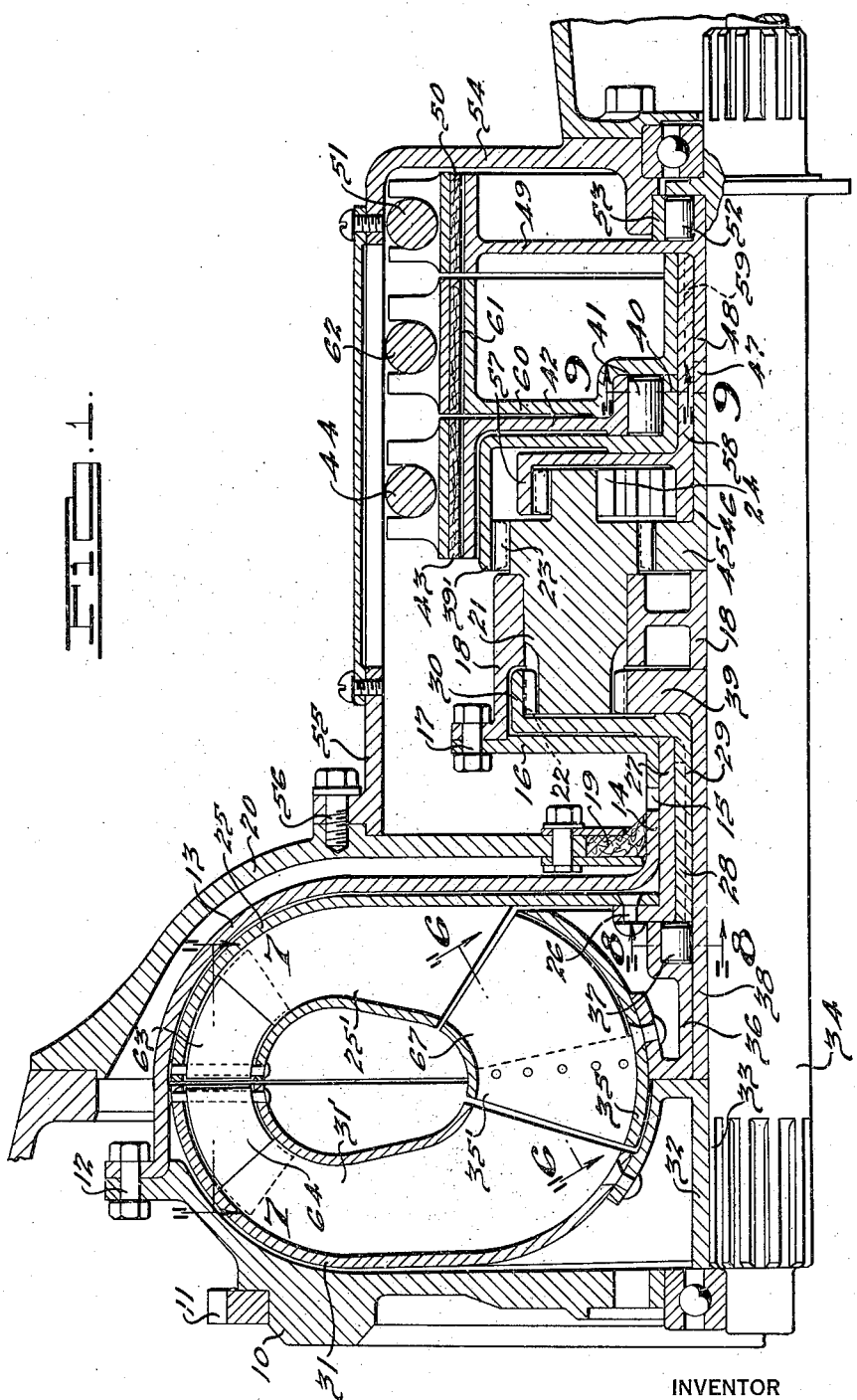

Referring to the drawings, 10 designates the flywheel of the vehicle engine which carries the usual starting gear 11. Bolted to the flywheel 10 at 12 is a shell-like housing member 13 which encloses the hydraulic unit and has a rearwardly extending portion 14 to which is attached by means of a jaw clutch 15 a plate-like member 16. The latter is fastened by bolts 17 to a carrier member 18. A resilient sealing member 19 is provided between the housing 20 and the rearward extension 14 as illustrated.

The carrier 18 carries a plurality (preferably three) of planetary gear elements 21, each being provided with three sets of gear teeth designated respectively at 22, 23 and 24, the purpose of which will be presently made clear.

The hydraulic unit comprises three relatively rotatable elements 25, 31 and 35. The element 35 is adapted to serve both as an impeller and as a guide member and is carried by a sleeve 36. The element 25 is similarly adapted to serve both as an impeller and a guide member under different operating conditions and is fastened at 26 to a sleeve 27, the latter being splined at 28 to the forwardly extending portion 29 of an annulus gear 30. The runner or turbine element 31 is carried by a hub structure 32 splined at 33 on the output shaft 34.

Figure 8:
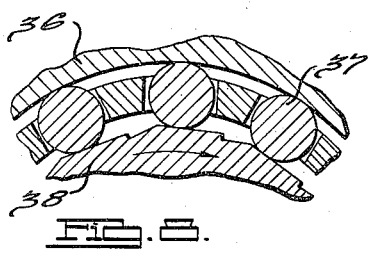
Fig. 8 is a fragmentary sectional view illustrating the details of the roller clutch as viewed along line 8—8 of Fig. 1.
Figure 9:
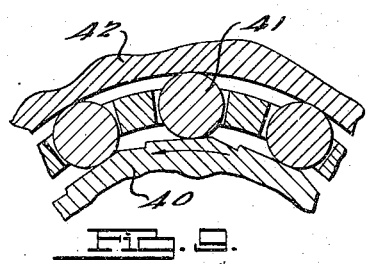
Fig. 9 is a similar view along the line 9—9 of Fig. 1.

A roller clutch 37 connects the sleeve 36 to the forwardly extending sleeve-like portion 38 of a sun gear 39, the latter being rotatably carried on the shaft 34. The clutch 37 (see Fig. 8) acts to provide a drive connection between the sun gear 39 and the hydraulic element 35 in the forward direction of rotation, but permits the element 35 to overrun the gear 39 upon tendency for the element to rotate faster than the gear due to inter-action in the mechanism.

The teeth 23 of planet gears 21 mesh with the teeth of an annulus gear 39' which has a sleeve-like rearwardly extending portion 40 forming one element of a roller clutch 41. The other clutch element comprises a brake drum 42 operatively associated with a brake band 43 and brake mechanism 44. The parts are so arranged that application of brake 44 will prevent backward rotation of annulus gear 39' while permitting the same to rotate forwardly through the roller clutch 41 which is of the reverse type as shown in section in Fig. 8.

The teeth 23 also mesh with a sun gear 45 which is carried by sleeve 46 connected by jaw clutch 47 with sleeve 48, the latter being formed as the forward extension of a brake drum 49 with which is associated the brake band 50 and brake mechanism 51. The sleeve 48 also has a rearwardly extending portion which forms one element of a roller brake device 52, the other element thereof being fixed against rotation to the rear end wall 54 of casing 56 which is fastened to the casing 20 at 57.

The third set of teeth 24 of planet elements 21 mesh with a third annulus gear 57 which is carried for rotation relative to sleeves 46 and 48 by a sleeve-like portion 58 splined at 59 to a brake drum 60 having a brake band 61 and brake mechanism 62 operably associated therewith.

Figure 6:
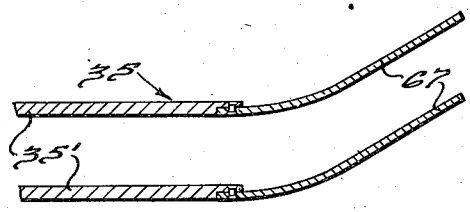
Fig. 6 is a sectional view taken approximately along the line 6—6 of Fig. 1 illustrating the construction of the impeller vanes.
Figure 7:
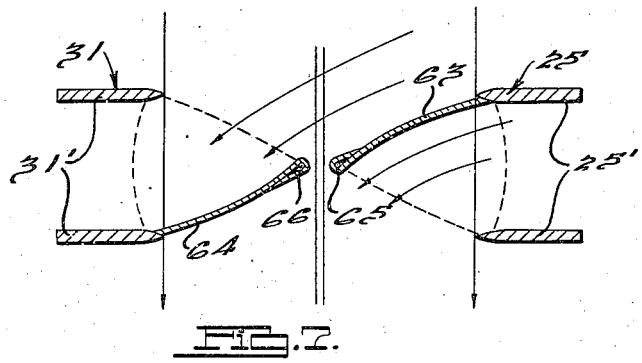
Fig. 7 is a sectional view taken approximately along the line 7—7 of Fig. 1 illustrating the construction of the guide and runner vanes.

As illustrated by Fig. 7, the output ends of vanes 25' of element 25 and the input ends of vanes 31' of element 31 are provided with spring steel flaps 63 and 64 respectively which are pivoted at 65 and 66 in such manner that they may accommodate themselves to the fluid flow. As illustrated in Fig. 6, the vanes 35' of impeller wheel 35 are provided with flexible trailing end portions 67 of spring steel which are adapted to bend in conformity with the fluid flow. The operation of the flexible vane portions 63, 64 and 67 will be made more apparent later on in the description.

The brakes 44, 51 and 62 may be manually operated or they may be power operated by any suitable means such as for example, a fluid pressure cylinder or an electrical solenoid.

In describing the operation of the transmission let it be assumed that the vehicle is at rest with the engine running and with the brake bands 43, 61 and 50 free from contact with the respective brake drums 42, 60 and 49. Under such conditions, the carrier 18 is rotating forwardly at engine speed being driven by the members 13 and 16 and, due to the fact that annulus gear 30, sun gear 39, annulus gear 39', sun gear 45 and annulus gear 57 are all free for forward rotation, there is no reaction point within the mechanism; consequently no drive is imparted to shaft 34 and a no-drag neutral is the result.

In order to start the vehicle for forward travel brake band 43 is applied, which may be done manually or by power means. Application of brake band 43 prevents reverse rotation of annulus 39' (roller clutch 41 being of the reverse lock type) and due to the fact that the resistance offered by the fluid in the hydraulic circuit to rotation of elements 25 and 35, which are connected to gears 30 and 39, respectively, tends to cause annulus gear 39' to rotate backwardly, the gear 39' becomes the reaction element of the planetary system.

The elements 25 and 35 are thus caused to rotate forwardly with the carrier 18, the impeller 35 turning in excess of input speed and the element 25 turning slowly in accordance with the relationship set up by the planetary gear ratios and thereby functioning as a reaction or guide element.

The fluid set in motion by the impeller 35 causes the flexible trailing edge portions 67 thereof to trail backwardly as illustrated in Fig. 6. This gives the outflow from element 35 a characteristic that is more radial than tangential and this has the effect of increasing the velocity of fluid circulation.

Figure 2:
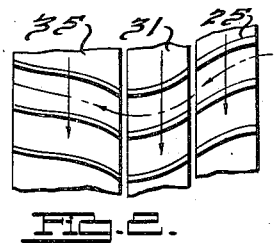
Fig. 2 is a diagrammatic representation of the fluid flow through the vane passages of the transmission during the first stage of torque conversion.

At this stage the transmission is functioning as a low ratio torque converter, the hydraulic element 31 delivering torque to the output shaft 34 through the hub 32. The diagram of Fig. 2 illustrates the fluid circuit under such conditions. The gears 45 and 24 are rotated during this period of operation, but as brake drums 49 and 60 are free, there is no driving effect.

As car speed increases, the torque demand on shaft 34 will fall off and the rotational speed of the element 31 will increase. As a result of this, the reaction force on the vanes of the wheel 25 will decrease until a point is reached where fluid resistance against forward rotation of element 25 is less than the fluid resistance against forward rotation of element 35. Wheel 25 will then begin to rotate forwardly and annulus gear 30 will rapidly increase in rotational speed forwardly. Annulus gear 39' will immediately begin forward rotation as gear 30 speeds up and the reaction point at 41 will be freed. This momentary increase in speed of element 25 causes an increase in the slip between elements 25 and 31 and hence temporarily increases the speed of fluid circulation. As the speed of fluid circulation increases, the reaction of the outflow from element 31 causes element 35 to slow down and eventually tend to rotate backwardly, which action is prevented by the overrunning rollers 52 which lock the element 35 against the backward rotation through the intermediary of sleeve 38, gears 39, 21 and 45, sleeve 46 and sleeve 48.

The transmission is now operating in its second torque conversion stage wherein hydraulic element 25 rotates at greater than input speed thereby functioning as an impeller and element 35 functions as a stationary guide wheel. The conversion ratio in this second stage is lower than that in the first stage, thus the effect of a shift to second speed in the conventional gear transmission is obtained.

Figure 3:
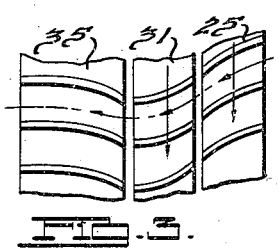
Fig. 3 is a similar view showing the fluid flow during the second stage of torque conversion.

This condition is illustrated diagrammatically in Fig. 3 where it can be seen that the flexible portions 67 of vanes 35' are now bent into a position substantially parallel with the direction of flow.

Further increase in car speed accompanied by lessening torque demand on shaft 34 permits element 31 to approach the speed of element 25. This decrease in slip between elements 31 and 25 is accompanied by a decrease in the fluid circulation and a lessening of the reaction on the vanes of element 35 until finally element 35 is rotating forwardly at the same speed as element 25. At the same time the fluid drag on the vanes 25' has decreased until there is no tendency for backward rotation of element 25, consequently the reaction on annulus gear 39' disappears and the gear 39' rotates forwardly with the carrier 18 as permitted by the rollers 41. The transmission is under these conditions in direct drive with the hydraulic elements functioning as a slip coupling; the elements 25 and 35 being the driving elements and element 31 the driven element. The hydraulic circuit is illustrated diagrammatically in Fig. 4.

Overdrive is obtained by setting brake band 50 which locks sun pinion 45 against rotation thereby causing ring gear 30 to be driven at an overspeed. Hydraulic element 25 is thereby also driven at an overspeed whereupon additional slip is caused between elements 25 and 31 and the fluid circulation is increased causing the outflow from element 31 to react backwardly against the vanes of element 35 which is restrained from backward rotation by the locked sun pinion 45. It is apparent that, during this period, element 35 will have some forward rotation because of the slow forward rotation of the pinion 39, but the reaction point is actually at the pinion 45.

The transmission is under these conditions functioning as a torque converter with the hydraulic element 25 rotating in excess of engine speed thereby tending to accelerate the element 31 and output shaft 34 to a speed approaching the speed of element 25. As the speed of shaft 34 approaches that of element 25 and the torque demand on shaft 34 decreases, the slip between the elements will correspondingly decrease and the outflow from the passages of element 31 will gradually tend to assume a forward direction thus impinging in the back of vanes 35' of element 35 and carrying said element along with element 31. Overrunning rollers 37 permit element 35 to overrun sleeve 38 which is rotating forwardly at reduced speed and thus element 35 idles in the hydraulic circuit.

Figure 4:
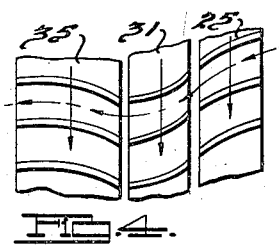
Fig. 4 is a similar view showing the fluid flow during the direct drive stage.

When the latter condition is reached, the transmission is in full overdrive ratio with the hydraulic unit functioning as a slip coupling as diagrammatically illustrated in Fig. 4, the vanes of the various hydraulic elements having the same positions as when the transmission is in the direct drive coupling stage.

Figure 5:
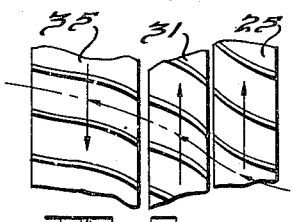
Fig. 5 is a similar view of the fluid flow during the overdrive stage.

Reverse drive may be obtained by setting brake band 61 whereupon annulus gear 57 is locked against rotation. As carrier 18 is rotated forwardly by the vehicle engine, gear 21 will be rotated backwardly because of the reaction at gear 57 and hydraulic element 25 will be rotated backwardly. The outflow from element 25 will immediately reverse the positions of the pivoted vanes 63, 64 as indicated by the dotted lines in Fig. 7, and thus the fluid from element 25 will be directed backwardly against the vanes 31' of element 31 causing element 31 to rotate backwardly. At the same time the outflow from element 31 will react against the vanes 35' of element 35, which element is turning slowly forwardly, being driven by the gear 39. The element 35 thus serves as a reaction element and the transmission functions as a torque converter driving the output shaft 34 in reverse. The fluid circuit under these conditions is illustrated in Fig. 5.

When all three brake bands are released there is no reaction point in the transmission and therefore no torque transmission therethrough, this being the neutral condition.

It may thus be seen that I have provided a simple and compact transmission which is adapted for automatic operation and which overcomes the principal disadvantage of similar types of prior art transmissions, i. e., insufficient number of speed ratios. My transmission provides two stages of torque conversion for accelerating the vehicle, direct drive with the hydraulic unit functioning as a slip coupling and one stage of overdrive with the hydraulic unit functioning as a slip coupling, the step from direct drive to overdrive being obtained through a stage of torque conversion in the hydraulic unit.

Having described a specific embodiment of my invention I wish to point out that such has been done for illustrative purposes only and it is not intended to limit the breadth or scope of the invention in the broader aspects thereof except as set forth in the claims appended below.

I claim:

1. In a hydraulic power transmission having a driving structure and a driven structure, a rotatable vaned runner member carried by the driven structure; a second rotatable vaned member adapted to act either as an impeller or as a guide wheel; a third rotatable vaned member adapted to act either as a guide wheel or an impeller; differential gear means for coupling the second and third members to the driving structure, said differential gear means being constructed and arranged such that the rotational speed of each of said members varies in accordance with the fluid reaction imposed thereon as a consequence of torque demand on the driven structure.

2. In a power transmission of the hydrodynamic type, a driven structure; a runner connected to said driven structure; a pair of rotatable fluid circulating members mounted in juxtaposition relative to said runner; said members being respectively adapted to function alternately as impeller and guide members; a planetary gearset including a driving element and two driven elements, the latter being connected to said fluid circulating members respectively; brake means connected with said planetary gearset and means for applying said brake thereby to provide reaction for said transmission; said planetary gearset being so constructed and arranged with respect to said fluid circulating members that said members are caused to exchange impeller and guide wheel functions respectively in response to lessening of torque demand in said driven structure thereby to produce a step-up in transmission ratio.

3. In a power transmission having a driving structure and a driven structure, a fluid runner carried by the driven structure; a first impeller member; a second impeller member; means including a planetary gearset for connecting said impeller members to said driving structure; control mechanism operably associated with said planetary gearset; said control mechanism including a brake so arranged with respect to said gearset that application of said brake establishes reaction for said gearset thereby to provide drive through said transmission.

4. In a power transmission having a driving structure and a driven structure, a fluid runner carried by the driven structure; a first impeller member; a second impeller member; a planetary gearset including a carrier connected to said driving structure, a sun gear connected to said first impeller and an annulus gear connected to said second impeller, said gearset also including planet pinions having a plurality of sets of teeth; a reaction gear element in engagement with one of said sets of pinion teeth; and means for restraining rotation of said reaction gear element thereby to provide drive through said transmission.

5. In a power transmission having a driving structure and a driven structure, a fluid runner carried by the driven structure; a first impeller member; a second impeller member; a planetary gearset including a carrier connected to said driving structure, a sun gear connected to said first impeller and an annulus gear connected to said second impeller, said gearset also including planet pinions having a plurality of sets of teeth; a reaction gear element in engagement with one of said sets of pinion teeth; means for restraining rotation of said reaction gear element in the direction of rotational tendency thereof to provide drive through the transmission, the planetary ratios being so arranged that said second impeller member rotates relatively slowly and thereby functions as a guide wheel for the fluid flowing from said first impeller to said runner to react against; and means including an overrunning brake device associated with said first impeller for permitting the same to lock against rotation upon tendency thereof to rotate backwardly in response to a decrease in slip between said runner and second impeller thereby to provide a step-up in driving ratio.

6. In a power transmission having a driving structure and a driven structure, a fluid runner carried by the driven structure; a first impeller member; a second impeller member; a planetary gearset including a carrier connected to said driving structure, a sun gear connected to said first impeller and an annulus gear connected to said second impeller, said gearset also including planet pinions having a plurality of sets of teeth; a reaction gear element in engagement with one of said sets of pinion teeth; means for restraining backwardly rotation of said reaction gear element thereby to establish forward drive through said transmission; a second reaction gear element in engagement with another of said sets of pinion teeth, and means for restraining rotation of the last reaction gear element thereby to provide reverse drive through said transmission.

7. In a hydrodynamic power transmission having driving and driven structures, a runner carried by the driven structure; an impeller drivingly connected to the driving structure, said connecting means including a planetary gearset having a carrier driven by said driving structure; a planet pinion carried by said carrier having a plurality of sets of teeth; annulus gears in mesh with said respective sets of teeth; brake means associated with at least two of said annulus gears; the ratios between said pinion teeth and the respectively associated annulus gear being such that said impeller may be driven forwardly or backwardly relative to the driving structure in response to setting of a selected one of said brake means.

8. In a hydrodynamic power transmission having driving and driven structures, a runner carried by the driven structure; an impeller drivingly connected to the driving structure, said connecting means including a planetary gearset having a carrier driven by said driving structure; a planet pinion carried by said carrier; two sets of teeth of respectively different pitch diameter on said pinion, each set thereof meshing respectively with an annulus gear and a sun gear; a driving connection between one of said annulus gears and said impeller; brake means operably associated with the other annulus gear and with its associated sun gear; and means for applying said brake means to selectively restrain rotation of said gears thereby to cause said impeller to be driven at an underspeed or at an overspeed with respect to said carrier.

9. In a hydrodynamic power transmission having driving and driven structures, a runner carried by the driven structure; an impeller drivingly connected to the driving structure, said connecting means including a planetary gearset having a carrier driven by said driving structure; a planet pinion carried by said carrier; a first set of teeth on said pinion; a first annulus gear meshed with said first set of teeth and drivingly connected to said impeller; a second set of teeth on said pinion, the pitch diameter thereof being different from that of said first set of teeth; a second annulus gear in mesh with said second set of teeth; a sun gear in mesh with said second set of teeth; brake mechanism connected to said second annulus gear and said sun gear and operable to lock the same against rotation; said brake mechanism being adapted for operation to selectively restrain rotation of said gears thereby to cause either an underspeed drive or an overspeed drive to be imparted to said impeller upon rotation of said driving structure.

10. In a power transmission, a driving shaft; a driven shaft; a fluid runner carried by said driven shaft; a pair of fluid impellers rotatably carried on said driven shaft; means for driving said impellers from said driving shaft and for distributing the drive of said shaft between said impellers in a ratio varying directly with the difference in speeds of said impellers comprising a planetary gearset having a carrier connected to said driving shaft, a sun gear connected to one of said impellers and an annulus gear connected to the other of said impellers.

11. In a power transmission, a driven shaft; a fluid runner carried by said driven shaft; a fluid impeller operably related to said runner; means for drivingly connecting said impeller to said driving shaft comprising planetary gearing; and control means operatively associated with said gearing comprising selectively operable brake means adapted for operation to selectively restrain rotation of certain of the planetary gears whereby either an underspeed or an overspeed drive relation is established between said driving shaft and said impeller.

12. In a hydraulic power transmission having a driving structure and a driven structure, a hydraulic turbine wheel drivingly connected to the driven structure; a pair of additional hydraulic wheels disposed in driving relation with said turbine wheel; a planet carrier adapted to be driven by the driving structure; a planet pinion carried by said carrier; annulus and sun gears respectively disposed in mesh with said pinion; means drivingly connecting said annulus and sun gears respectively with said respective additional hydraulic wheels; and means for controlling rotation of said pinion such that the driving torque of said carrier is divided between said additional hydraulic wheels whereby said hydraulic wheels may act alternately as impeller and guide wheels in response to variations in torque demand on said turbine wheel.

13. In a hydraulic power transmission having a driving structure and a driven structure, a hydraulic turbine wheel drivingly connected to the driven structure; a pair of hydraulic wheels of different diameter disposed in driving relation with said turbine wheel; a planet carrier driven by the driving structure; a planet pinion on said carrier; an annulus gear meshing with said pinion and drivingly connected with the larger of said hydraulic wheels; a sun gear meshing with said pinion and drivingly connected with the smaller hydraulic wheel; and means for controlling rotation of said pinion whereby each of said hydraulic wheels is permitted to act either as an impeller or as a guide wheel in accordance with the fluid reaction imposed thereon by said turbine wheel under different driving conditions.

14. In a hydraulic power transmission having a driving structure and a driven structure, a hydraulic turbine wheel drivingly connected to the driven structure; a pair of hydraulic wheels of different diameter disposed in driving relation with said turbine wheel; a planet carrier driven by the driving structure; a planet pinion on said carrier; two sets of teeth on said pinion; an annulus gear meshing with one of said sets of teeth and drivingly connected with the larger of said hydraulic wheels; a sun gear meshing with said teeth and drivingly connected with the smaller hydraulic wheel; a second annulus gear meshing with the second set of pinion teeth; a second sun gear meshing with said second set of pinion teeth; and overrunning brake devices operably associated with the last named annulus and sun gears respectively for preventing reverse rotation of the same while permitting free forward rotation thereof whereby either of said hydraulic wheels may act as a guide member in accordance with the reaction force imposed thereon by drive of said turbine wheel.

15. The combination set forth in claim 14 wherein release means is provided for releasing the brake device associated with said second annulus gear thereby to establish a non-driving neutral condition in said transmission.

16. The combination set forth in claim 14 wherein brake means is provided for locking said second sun gear against rotation whereby the first named annulus gear is driven at an overspeed.

17. In a hydraulic power transmission which includes an input wheel adapted for rotation to energize a fluid, an output wheel adapted to be driven solely by said fluid, an additional hydraulic wheel disposed in series relation with the aforesaid wheels; drive means; and differential means connecting said drive means with said input wheel and said additional wheel constructed and arranged such that said additional wheel may function as an auxiliary pump wheel.

18. In a hydraulic power transmission which includes an input wheel and an output wheel adapted to be driven solely by fluid set in motion by said input wheel, an additional hydraulic wheel disposed in series relation with the aforesaid wheels; drive means connected to said input wheel; and differential means drivingly connecting the input wheel with said additional wheel.

19. In a power transmission having a driving structure and a driven structure; a fluid member carried by the driven structure; a fluid impeller; means including planetary gearing having a pair of reaction gears for connecting the impeller member to the driving structure; control mechanism operably associated with said planetary gearing including a pair of brakes respectively arranged in operative relationship with said reaction gears such that said gears are adapted to be selectively held from rotation; the pitch diameters of the reaction gears being such that either forward or reverse rotation may be selectively imparted to the impeller.

20. The combination set forth in claim 19 wherein the impeller is provided with vanes having adjustable discharge portions and the turbine is provided with vanes having adjustable entrance portions, the said adjustable portions being adjustable by the fluid flow in accordance with the direction of rotation of the impeller.

21. In a fluid power transmitter having an impeller wheel adapted to be selectively driven forwardly or reversely and a turbine wheel adapted to be driven by fluid set in motion by said impeller, a plurality of vanes carried by said wheels and forming fluid passageways therein; and means comprising flap elements pivotally mounted at the discharge ends of the impeller passageways and at the entrance ends of the turbine passageways for controlling and directing the fluid flow in accordance with the direction of rotation of the impeller.

22. In a fluid power transmitter having a fluid wheel adapted to be rotated forwardly or reversely and provided with vanes forming fluid passageways, a plurality of flaps pivotally mounted at one end of said passageways, the pivotal axis thereof being spaced from the ends of said vanes and positioned substantially centrally of said passageways, and the web portions of said flaps extending toward and into engagement with one of the adjacent vanes whereby said flaps are adapted to pivot under influence of the fluid flow thereby to accommodate the ends of said passageways to the direction of said flow.

23. In a hydraulic power transmission which includes an input wheel, an output wheel, and an additional hydraulic wheel disposed in series relation with said aforesaid wheels, drive means; and differential means connecting said drive means with said input wheel and said additional wheel constructed and arranged such that said additional wheel is adapted to function either as a reaction wheel or as a pump wheel in accordance with variations in torque demand on said output wheel.

WILLIAM D. TIPTON.